United States Patent
Van Beckhoven (10) Patent No.: US 6,656,513 B2
(45) Date of Patent: Dec. 2, 2003

(54) BREAD IMPROVING COMPOSITION

(75) Inventor: Rudolf Franciscus Wilhelmus Cornelus Van Beckhoven, Ek Breda (NL)

(73) Assignee: Gist Brocades B. V. (NL)

( * ) Notice: Subject to any disclaimer, the term of this patent is extended or adjusted under 35 U.S.C. 154(b) by 0 days.

(21) Appl. No.: 09/865,415

(22) Filed: May 25, 2001

(65) Prior Publication Data

US 2002/0102327 A1 Aug. 1, 2002

Related U.S. Application Data

(63) Continuation of application No. 09/126,642, filed on Jul. 31, 1998, now abandoned.

(30) Foreign Application Priority Data

Jul. 31, 1997 (EP) .............................. 97202386
Jul. 31, 1997 (EP) .............................. 97202387

(51) Int. Cl.$^7$ ................................. A21D 8/04
(52) U.S. Cl. ......................... 426/20; 426/61; 426/549
(58) Field of Search .................... 435/209; 426/549, 426/20, 61, 52, 555, 653

(56) References Cited

U.S. PATENT DOCUMENTS

| | | | | |
|---|---|---|---|---|
| 4,859,474 A | * | 8/1989 | Neidleman et al. | 426/28 |
| 4,894,338 A | * | 1/1990 | Knowles et al. | 435/91.41 |
| 5,066,218 A | * | 11/1991 | Silver | 127/37 |
| 5,314,692 A | * | 5/1994 | Haarasilta et al. | 424/94.2 |
| 5,362,502 A | * | 11/1994 | Slade et al. | 426/20 |
| 5,514,404 A | * | 5/1996 | Zimmerman et al. | 426/549 |
| 5,874,274 A | * | 2/1999 | Jakobsen et al. | 435/200 |
| 6,228,629 B1 | * | 5/2001 | Paloheimo et al. | 435/200 |

FOREIGN PATENT DOCUMENTS

| | | | |
|---|---|---|---|
| EP | 0 368 015 | * | 5/1990 |
| EP | 0 137 280 | | 11/1992 |
| WO | 95/16360 | * | 6/1995 |
| WO | 99/06574 | * | 2/1999 |

OTHER PUBLICATIONS

Barnett et al., "Properties of native and site–mutagenized cellobiohydrolase II" ACS Symposium Series—Amer. Chem. Society, Jan. 1993.*

Rodonovia et al. "Enzyme Preparations from Mycelial Fungi that Cleave Cereal Grain Polymers", Applied Biochemistry and Microbiology, 31(4): 433–440, Apr. 1995.*

Database WPI Section CH, Week 8325; Abstract XP002052368, Derwent Publications Ltd. London, BG & SU 949 002 Aug. 10, 1982.

Gaines, C.S. et al., "Effects of Selected Commercial Enzymes on Cookie Spread and Cookie Dough Consistency" Cereal Chemistry 66(2):73–78 Feb. 1989.

Rodonovia et al., "Enzyme Preparations from Mycelial Fungi that Cleave Cereal Grain Polymers" Applied Biochemistry and Microbiology 31(4):370–376 (1995) Translated from Prikladnaya Biokhimiya i Mikrobiologiya 31(4):433–440 Apr. 1995.

Rosenfeld et al., "In–Gel Digestion of Proteins for Internal Sequence Analysis after One–or Two–Dimensional Gel Electrophoresis" Analytical Biochemistry 203:173–179 (1992).

* cited by examiner

*Primary Examiner*—Keith Hendricks
(74) *Attorney, Agent, or Firm*—Morrison & Foerster LLP (57) ABSTRACT

The present invention discloses a bread improving composition containing cellobiohydrolase and its use in bread making.

18 Claims, 3 Drawing Sheets

```
CGAAATCACT AAAAGGAGAC GACTAGAGTC TTATACAATC TCATTACAAT50
GCATCAACGT GCCCTTCTCT TCTCAGCCCT GCTGACGGCT GTTCGCGCCC100
AGCAAGCCGG AACGCTCACG GAGGAAGTCC ATCCTTCCTT GACCTGGCAG150
AAATGCACTT CTGAAGGCAG CTGCACTGAA CAGAGTGGCT CAGTTGTCAT200
TGACTCGAAC TGGCGCTGGA CCCATTCCGT CAATGACAGC ACCAATTGCT250
ACACTGGCAA CACCTGGGAT GCAACTCTCT GCCCTGATGA TGAGACCTGT300
GCGGCCAACT GCGCCCTGGA CGGAGCAGAC TACGAGTCCA CCTACGGTGT350
CACCACTGAC GGTGATTCAT TGACACTGAA ATTCGTCACT GGCTCCAATG400
TTGGCTCGCG GTTGTATCTA ATGGACACGA GCGACGAGGG ATACCAGACG450
TTCAACTTGC TTGACGCAGA GTTCACTTTC GACGTTGATG TGTCTAACCT500
CCCATGTGGG CTAAACGGCG CGTTGTACTT CACTGCAATG GACGCCGATG550
GTGGAGTCTC AAAATACCCT GCCAATAAGG CTGGAGCCAA GTACGGAACA600
GGATACTGTG ACTCCCAATG CCCCGGGAC CTGAAATTCA TCGACGGACA650
AGCCAACGTC GATGGCTGGG AACCTTCTAG CAACAATGAC AACACAGGTA700
TCGGCAATCA CGGTTCTTGC TGCCCTGAAA TGGATATCTG GGAGGCAAAC750
AAGATCTCGA CCGCATTGAC ACCCATCCT TGTGACAGCA GCGAACAGAC800
CATGTGTGAG GGTAACGACT GCGGTGGAAC CTACTCGGAT GATCGCTACG850
GAGGAACCTG CGACCCTGAC GGCTGCGACT CAACCCTTA TCGCATGGGC900
AACGACTCTT TCTACGGTCC TGGCAAGACC ATCGACACCG GATCCAAGAT950
GACGGTTGTG ACCCAGTTCA TCACTGATGG CTCTGGCTCC CTCAGCGAGA1000
TCAAGCGTTA CTACGTGCAG AACGGAAATG TTATAGCGAA CGCTGATTCC1050
AACATCTCTG GAGTGACTGG AAACTCGATC ACAACGGACT TCTGCACTGC1100
GCAGAAGAAG GCCTTTGGCG ACGAGGATAT ATTCGCTGAG CACAATGGAC1150
TTGCTGGAAT CAGTGATGCC ATGTCTTCCA TGGTTCTCAT CTTGAGCTTG1200
TGGGATGATT ACTATGCCAG CATGGAGTGG CTCGACAGCG ACTATCCCGA1250
GAACGCTACC GCTACCGACC CAGGTGTTGC ACGCGGAACA TGCGACTCGG1300
AATCAGGCGT CCCTGCGACA GTCGAGGGGG CGCATCCCGA TTCTTCGGTG1350
ACCTTCTCAA ACATCAAGTT CGGTCCCATC AACTCGACCT TCAGCGCTTC1400
CGCATAAGGG GAAGTGCAGG GTTCAGAGCC TCAATTACAT CCCACAAGCC1450
GAACACAACA GGACAGGTTC CTGAACGGA ATATGGGAGA GTTGCGGGCT1500
TGTAAATAGT CCGAAAAGTG GTCACTGCTT TTGTGTATCG GGCTGTCTTC1550
CCATTTTATT TTCATTCACT CCAGATTGAT TGATGCAGAT CTTGTTTGTT1600
GATTCTTTCA CTTCGTGCTG TGACTTTTTG TACCTAACTT CACATTCGTT1650
TCTTTTCTGT TTTTGAGTCC ACTCAATCCA AGAGACAGTT GTTCCTTTGC1700
T (SEQ ID NO:5)
```

FIGURE 1

```
MHQRALLFSA LLTAVRAQQA GTLTEEVHPS LTWQKCTSEG SCTEQSGSVV$^{50}$
IDSNWRWTHS VNDSTNCYTG NTWDATLCPD DETCAANCAL DGADYESTYG$^{100}$
VTTDGDSLTL KFVTGSNVGS RLYLMDTSDE GYQTFNLLDA EFTFDVDVSN$^{150}$
LPCGLNGALY FTAMDADGGV SKYPANKAGA KYGTGYCDSQ CPRDLKFIDG$^{200}$
QANVDGWEPS SNNDNTGIGN HGSCCPEMDI WEANKISTAL TPHPCDSSEQ$^{250}$
TMCEGNDCGG TYSDDRYGGT CDPDGCDFNP YRMGNDSFYG PGKTIDTGSK$^{300}$
MTVVTQFITD GSGSLSEIKR YYVQNGNVIA NADSNISGVT GNSITTDFCT$^{350}$
AQKKAFGDED IFAEHNGLAG ISDAMSSMVL ILSLWDDYYA SMEWLDSDYP$^{400}$
ENATATDPGV ARGTCDSESG VPATVEGAHP DSSVTFSNIK FGPINSTFSA$^{450}$
SA  (SEQ ID NO:6)
```

BREAD IMPROVING COMPOSITION

This application is a continuation of U.S. Ser. No. 09/126,642 filed Jul. 31, 1998, now abandoned. Priority is claimed to this parent application under 35 U.S.C. §120; priority is also claimed under 35 U.S.C. §119 to European applications 97/202386.5 and 97/202387.3, both filed Jul. 31, 1997.

The present invention relates to the use of an enzyme in bread making as bread improving activity.

A bread improving activity is one which improves any property of the baked product (particularly the bread volume and/or crumb structure of the bread), and/or improves any property of the dough. Throughout this specification the term bread volume should be read as 'baked product volume' where the content is appropriate.

A bread improving composition is added to a dough in addition to the basic ingredients which are generally flour, water, yeast and salt.

One of the most important characteristics of bread which is influenced by enzymes is bread volume. In order to obtain high bread volumes, compositions containing hemicellulase and/or amylolytic enzymes can be added. Hemicellulases are defined as enzymes capable of hydrolysing the non-starch polysaccharides in the flour. The commercially available compositions mostly originate from fungae, such as Aspergillus or Trichoderma. These compositions are unpurified mixtures of different enzyme activities. So far endo-xylanases and arabinofuranosidases have been identified as contributing to the activities of the bread improving compositions.

The use of hemicellulase preparations in breadmaking gives an improved oven spring, improved bread volume and an improved grain structure to the finished baked product. However, when hemicellulase preparations are used at higher concentrations the dough may become slack and sticky. This limits the use of hemicellulase preparations. Although the problem can be overcome by the addition of glucose oxidase, the need to add ad extra enzyme is a drawback. A better situation would be the availability of an enzyme with bread improving activity which has no negative side effects on the dough. This raises the possibility that emulsifiers may be replaced completely by enzymes. The resistance of consumers to chemical additives is growing and there is therefore a constant need to replace emulsifiers by consumer friendly additives such as enzymes.

The present invention provides the use of a CelloBioHydrolase (CBH), with bread improving activity to make bread. The CelloBioHydrolase is preferably CBH-I. The most important effects are an improved breadvolume and an improved crumb structure which are not accompanied by bad dough handling properties due to stickiness of the dough. Preferably the CBH is of microbial origin, more preferably fungal CBH is used. For example CBH can be obtained from Trichoderma or Aspergillus. CBH-I can be obtained from *T. reesei, T. longibrachiatum* and *T. viride*. Cellobiohydrolase I and II from *Trichoderma reesei* have been described in EP-B 0 137 280 and U.S. Pat. No. 4,894,338, respectively. CBH I has also been identified in *Agaricus bisporus, Phanerochaete chrysosporium, Trichoderma viride* and *Humicola grisea*. The present invention also discloses a composition with bread improving activity, which comprises CBH in an effective amount when added to other basic dough ingredients. The composition may also comprise effective amounts of α-amylase and/or endo-xylanase.

By "effective amount" is meant an amount of enzyme which is sufficient for providing a measurable effect on the intended effect, in case of CBH this would be a measurable effect of the improved breadvolume or improved crumb structure.

The fact that CBH has an effect in baking is surprising because CBH acts on cellulose which only constitutes 0.3% of wheat flour. CBH hydrolyses the 1,4-β-D-glucosidic linkages in cellulose causing release of cellobiose. A possible explanation would be that CBH acts on cellulose-xylan interfaces in the endosperm cell walls.

As mentioned above the use of commercial preparation of the endo-xylanases of Trichoderma and Aspergillus is already known. Although traces of CBH are present in such preparations the amount of CBH is insufficient to contribute to improving the dough or bread. According to the present invention CBH can be used alone or in combination with other enzymes with bread improving activity, preferably endo-xylanase. Endo-xylanase can be obtained from Aspergillus or Trichoderma. Generally, use of the composition of the invention will give a dough with good handling properties, while the final baked product will have an improved volume and crumb structure.

With the use of CBH a controlled optimization of the bread improvers, or bread improving compositions, is possible.

It will be appreciated that the skilled person will be able to find the optimal amounts which can be added to the dough.

A composition of the invention can be used in combination with the normal bread improving constituents and enzymes, for example xylanases, α-amylase, endo-xylanase, arabinofuranosidase, β-amylase, glucoseoxidase, protease or lipase. The CBH can therefore be incorporated in a breadimproving composition. By 'breadimproving composition' is meant a composition which comprises substances other than those conventially used in baking (i.e. flour, water, yeast, optionally salt), and which can be used to improve the properties of dough and/or the baked product.

The CBH may also be incorporated in a pre-mix. By pre-mix is to be understood a mixture of baking agents, in general including flour, which is prepared to ease handling in dough preparations processes. Normally a pre-mix will not contain the water necessary to prepare the dough.

The dough of the invention contains at least 0.5 mg of CBH per kg of flour, preferably 1 mg/kg of flour, more preferably more than 5 mg of CBH per kg of flour, even more preferable more than 10 mg of CBH per kg of flour. In general the amount of CBH is less than 100 mg of CBH per kg of flour, preferably less than 50 mg of CBH per kg of flour.

LEGEND TO THE FIGURES

FIG. 1: Seq. Id. No. 5

EXAMPLE 1

CBH-1 was obtained from a Trichoderma strain. The strain was grown on a cellulose containing medium in order to induce cellulose degrading enzymes. After fermentation the broth was filtered, sterile filtered, subjected to ultrafiltration and spray dried. 0.5 Kg of the product of the process was suspended in 2 l of 50 mM NaAc pH 5 and the mixture was centrifuged for 15 minutes at 4000 rpm. The clear supernatant was ultrafiltered until the conductivity was less than 2 mS.

Approx. 3 gram of protein was loaded on an A DEAE (Biogel A) column which was equilibrated in 50 mM NaAc pH 5. CBH I enriched fractions were eluted in a linear gradient from 0% to 100% B in A, in which A is a buffer containing 50 mM NaAc pH 5 and B is 1M NaCl in Buffer A, the pH is adjusted to 5.

The CBH-1 enriched fractions were ultrafiltered until the conductivity was lower than the conductivity of 10 mM NaAc pH 3.6. The CBH I sample was then loaded on a Mono S column which was equilibrated in 10 mM NaAc pH 3.6. CBH I was eluted in a linear gradient from 0% to 10% B in A, followed by a gradient from 10% to 100% B in A, in which A is 10 mM NaAc pH 3.6 and B is 1 M NaCl in A. Protein concentration in each eluted fraction was determined using quantitative amino acid analysis. The purified product contained 7 mg protein/ml and was pure as judged by SDS-gelelectrophoresis.

EXAMPLE 2

CBH-1 (see Example 1) was tested in a full scale baking trial using the following recipe:

Flour 2000 g Kolibri (Meneba) & 500 g Ibis (Meneba);
1305 g water;
50 g block yeast, Konings gist®;
50 g salt;
12.5 g sugar;
25 ppm ascorbic acid;
20 ppm Fermizyme® (TM) P200 (Fungal α-amylase, obtainable from Gist-brocades);
optionally Fermizyme® HS 2000 and/or CBH-1 (Trichoderma), see Table 1.

The ingredients were mixed together and used to form three 900 gram doughs. These doughs were fermented. The first fermentation was for 30 minutes and the second for 40 minutes at 30° C. After shaping of the dough a final fermentation was performed for 70 minutes at 35° C. The bread was then baked for 30 minutes at 250° C. The loaves were then allowed to cool and bread volume was determined using the rapeseed displacement method. Other properties were also determined.

The obtained results are shown in Table 1.

Each baking test was carried out in triplicate. These triplicate tests were carried out in parallel. The evaluation of the loaves is given as the mean value of the results obtained from 3 loaves. The dough characteristics and crumb structure were judged by trained bakers.

TABLE 1

| Addition | Dosage in mg/kg flour | Dough handling | Volume | Volume increase in % | Crumb-structure |
|---|---|---|---|---|---|
| No addition | | 0 | 3831 | 0 | — |
| Fermizyme HS2000 | 60 | 0 | 4099 | 7 | + |
| Fermizyme HS2000 | 120 | — | 4291 | 12 | - |
| CBH-1 | 3.5 | + | 4090 | 7 | + |
| CBH-1 | 7 | +++ | 4215 | 10 | ++ |
| Fermizyme HS2000 and CBH-1 | 60 3.5 | +++ | 4294 | 12 | ++ |
| Fermizyme HS2000 and CBH-1 | 60 7 | +++ | 4401 | 15 | +++ |

— — = very poor
− = poor
0 = neutral
+ = good
++ = very good
+++ = excellent

Fermizyme® HS2000 is an *A. niger* endo-xylanase preparation obtainable from Gist-brocades. As can be seen from the results in Table 1 CBH-1 improves the handling properties of the dough and the crumb structure of the bread, both when it is used alone or in combination with Fermizyme® HS2000.

EXAMPLE 3

A gene encoding a CBH from *A. niger* was cloned and a sample of CBH was prepared by expression of the cloned enzyme as described in Example 5.

A baking trial was performed using the same protocol as described in Example 2. 2.5 mg of the expressed *A. niger* CBH was added per kg of flour. This resulted in a loaf volume increase of 10%, improved dough handling properties and improved crumb structure as compared to the reference where no CBH was added.

EXAMPLE 4

Figure 3:
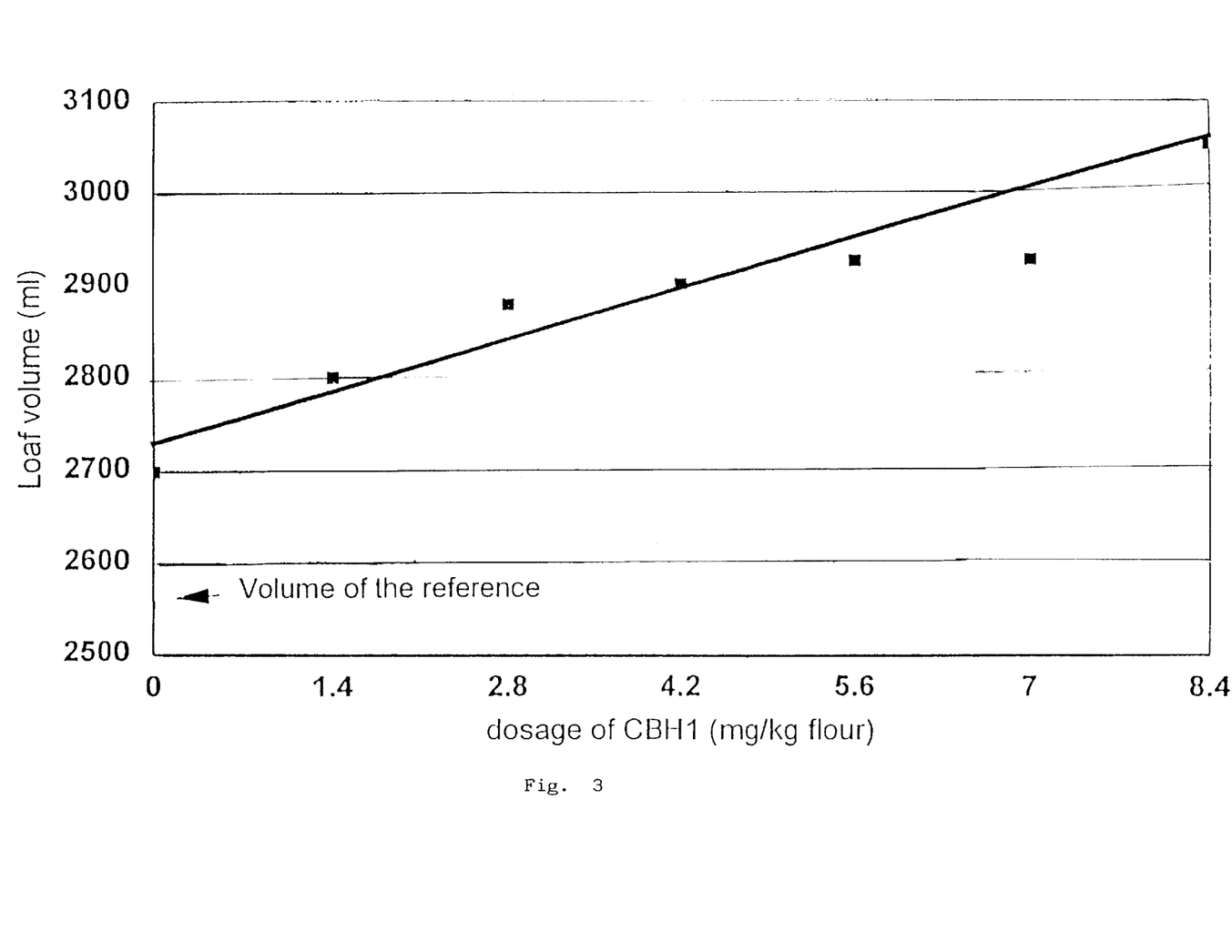
FIG. 3: Bread volume is given as a function of the dosage of CBH-1.

A baking trial as described in Example 2 was performed, except that the flour used was Kluut flour (Meneba) and a different type of mixer was used. CBH-1 (see Example 1) from Trichoderma was added in addition to a commercially available Trichoderma preparation (hemicellulase). The hemicellulase preparation was tested at 15 ppm (the recommended dosage was 3 to 20 ppm). As shown in FIG. 3 a significant increase in volume can be obtained in addition to the increase due to the hemicellulase preparation. The volume of the reference, where no hemicellulase and CBH-1 was added, was 2554 ml.

EXAMPLE 5

Strains
*E. coli* LE 392 (Murray, 1977):
e14−(mcrA) hsdR514, supE44, supF58, lacY1, or Δ(lac1ZY)6, galK2, galT22, metB1, trpR55

EXAMPLE 5.1

Identification of an *A. niger* Cellobiohydrolase

*A. niger* N402 was grown in Aspergillus minimal medium (MM) (contains per liter: 6.0 g $NaNO_3$, 1.5 g $KH_2PO_4$, 0.5 g $MgSO_4.7H_2O$, 0.5 g KCl, pH 6.0 and 1 ml Vishniac (Vishniac and Santer, 1957) solution (contains per liter 10 g EDTA, 4.4 g $ZnSO_4.7H_2O$, 1.0 g $MnCl_2.4H_2O$, 0.32 g $CoCl_2.6H_2O$, 0.32 g $CuSO_4.5H_2O$, 0.22 g $(NH_4)_6Mo_7O_{24}.4H_2O$, 1.47 g $CaCl_2.2H_2O$, 1.0 g $FeSO_4.7H_2O$, pH 4.0) supplemented with 1.5% wheat arabinoxylan. This medium was inoculated with $1*10^6$ spores per ml and mycelium was grown for 96 hours at 30° C. and 250 rpm in an orbital New Brunswick shaker. The culture filtrate was collected after filtration of the mycelium on Myracloth (nylon gauze) using a Büchner funnel and mild suction. The pH of the culture filtrate was adjusted to pH 6.0 with 0.1 M NaOH after which the culture filtrate was diluted by the addition of 2 volumes of Millipore water.

DEAE-Sephadex A-50 was equilibrated in 50 mM sodium acetate buffer pH 5.0 and was added to the culture filtrate. After 30–60 minutes of stirring at 4° C., the DEAE-Sephadex together with the culture filtrate were passed through a funnel with a glass filter holder and the DEAE-Sephadex A-50 was transferred to a column. This column was first eluted with 50 mM sodium acetate buffer pH 5.0, then with 50 mM sodium acetate buffer pH 5.0+0.5 M NaCl. Fractions containing α-arabinofuranosidase activity, as was detected using the chromogenic substrate 4-methylumbelliferyl-α-L-arabinofuranoside (detects α-arabinofuranosidases) (Sigma M-9519), were pooled and desalted by dialysis against Millipore water and subsequently dialysed against 20 mM piperazine-HCl buffer pH 5.0. After dialysis the sample was loaded on a DEAE-Sepharose Fast Flow column, this column was first eluted with 3 volumes 20 mM piperazine-HCl buffer pH 5.0 and then with a linear gradient of 0.5 M NaCl in 20 mM piperazine-HCl buffer pH 5.0. Detection of the eluted protein was performed by continuous measurement of the UV absorption at 280 nm. Fractions of 10 ml were collected which were assayed for activity of α-arabinofuranosidase on para-nitrophenyl-α-L-arabinofurano-side (PNP-A)(Sigma N-3641) the α-arabinofuranosidase activity was found in fractions 11–27, 41–47 and 52–61. Fractions 41–47 were pooled and subsequently dialyzed against 100 mM piperazine-HCl buffer pH 5.0 and the whole sample (200 ml) was loaded on a DEAE Sepharose FF column (Pharmacia) to concentrate the protein to a single peak using a 1 M NaCl gradient in 200 mM piperazine-HCl pH 5.0 buffer. Protein containing fractions were pooled (20 ml) and were first dialyzed against Millipore water, then against 20 mM piperazine-HCl pH 5.0 and finally concentrated using a Speed Vac concentrator to 6 ml. This preparation was loaded on a Sephacryl S-300 column, which was eluted with 20 mM piperazine-HCl pH 5.0, 0.1 M NaCl. Fractions having activity on PNP-A were pooled, dialyzed against 10 mM piperazine-HCl pH 5.0 and concentrated in a Speed Vac concentrator to 2 ml. This sample was then loaded on a Superdex 75 (Hiload column 16/60) (Pharmacia) column, which was equilibrated and eluted with 20 mM piperazine-HCl pH 5.0, 0.1 M NaCl. Fractions having α-arabinofuranosidase activity were dialyzed against 10 mM Na-acetate buffer pH 3.5. The final purification was done on a Mono S cation exchange column (HR 5/5, Pharmacia). The column was equilibrated with 10 mM Na-acatate buffer pH 3.5 buffer in which the sample was loaded. Protein was eluted using 27 ml of a linear gradient 1 M NaCl in 10 mM Na-acatate buffer pH 3.5. The enzyme eluted at about 100 mM NaCl.

The purified enzyme was sent to EUROSEQUENCE (Groningen, The Netherlands). There it was applied to an SDS-PAGE gel and internal sequence analysis of the protein was performed essentially as described by Rosenfeld et al. (Rosenfeld, J., Cadevielle, J., Guillemot, J., Ferrara, P. (1992) Anal. Biochem. 203:173–179).

Amino acid sequences were performed using an automated sequenator (Model 477A, Applied Biosystems) coupled to an HPLC (Model 120A ABI) for analysis of the phenylthiodantoin (PTH) amino acids. The following internal sequences were determined:

Leu-Tyr-Leu-Met-Ser-Asp-Asp-Ser-Asn-Tyr-Glu-Leu-Phe-Lys (SEQ. ID. NO. 1)

Leu-Gly-Asn-Thr-Asp-Phe-Tyr-Gly-Pro-Gly-Leu-Thr-Val-Asp-Thr-Asn-Ser-Pro-Phe-Thr-Val-Val-Thr-Gln (SEQ. ID. NO. 2)

Surprisingly, the partial amino acid sequence of the internal fragment of the isolated enzyme (SEQ. ID. NO. 1) showed a very high identity with *Agaricus bisporus* CBH I, i.e. 11 out of 13 residues were identical. This was the first indication of cellobiohydrolases in Aspergillus.

EXAMPLE 5.2

Isolation of cDNA Clones Coding for *A. niger* Cellobiohydrolase

EXAMPLE 5.2.1

Generation of Probe

The *A. bisporus* CBH I enzyme is encoded by the cel2 gene (EMBL Acc. No. Z50094). The two following oligonucleotides were designed to PCR the coding region of cel2:

5'-GTC GGT ACC AAC ATG GCC G-3' (19-mer) (SEQ.ID.NO.3)

5'-ACT CAG AAA CAT TGG CTA TAG-3' (21-mer) (SEQ.ID.NO.4)

These oligo nucleotides, as depicted in SEQ.ID.NOS. 3 and 4, were used in PCR (Saiki et al., 1988) using plasmid DNA containing *Agaricus bisporus* cel2 sequences as a template.

For a PCR 2 ng of plasmid DNA was combined with 5 μl 10*reaction buffer (200 mM Tris-HCl, pH 8.4; 500 mM KCl); 3 μl 50 mM MgCl$_2$; 4.0 μl 1.25 mM of each of the four deoxynucleotide triphosphates and 50 pmol of the oligonucleotides in a final volume of 50 μl. The reaction mixture was mixed and 0.5 μl TAQ polymerase (5 U/μl) (Life Technologies) was added. The DNA was heat denatured by incubation for 5 minutes at 95° C. followed 25 cycli of 1 minute at 95° C., 1 minute at 52° C. and 1 minute at 72° C. After these 25 cycli the mixture was incubated for 5 minutes at 72° C. Analysis of the reaction products revealed one discrete product of 1.5 kb, which was the expected size.

EXAMPLE 5.2.2

$^{32}$P-labelling of 1.5 kb PCR Fragment

The 1.5 kb fragment obtained by PCR was isolated and labelled as described in EP-A-0 463 706, Examples 2.2 and 7.1.

EXAMPLE 5.2.3

Screening of the *A. niger* N400 cDNA Library for Cellobiohydrolase cDNA Clones

The construction of the *A. niger* cDNA library is described in WO 96/06935 (Example 3).

To screen the *A. niger* N400 cDNA library for cbh cDNA clones, 5*10$^3$ pfu per plate were plated in NZYCM topagarose containing 0.7% agarose on 85-mm-diameter NZYCM (1.5% agar) plates as described (Maniatis et al., 1982, pp. 64), using *E. coli* LE392 as plating bacteria.

After overnight incubation of the plates at 37° C. two replicas of each were made on HybondN filters (Amersham) as described in Maniatis et al. (1982, pp. 320–321).

The filters were prehybridized at 65° C. for two hours in prehybridization buffer containing; 6xSSC, 0.5% SDS, 5xDenhardt's solution, 0.01 M EDTA and 100 μg/ml heat denatured herring sperm DNA (Boerhinger Mannheim). After two hours prehybridization, the prehybridization buffer was replaced by hybridization buffer which was identical to the prehybridization buffer, but contains the $^{32}$P labelled 1.5 kb PCR fragment containing *Agaricus bisporus* cel2 sequences and prepared as described in Example 5.2.2. The filters were hybridized for 18 hours at a temperature of 60° C.

After hybridization the filters were first washed at 60° C. for 30 minutes in 4*SSC/0.5% SDS followed by two washing steps at 60° C. during 30 minutes in 2*SSC/0.5% SDS. The air dried filters were taped on a sheet of Whatman 3MM paper, keying marks were made with radioactive ink and the Whatman paper and filters were covered with Saran Wrap. Hybridizing plaques were identified by exposure of Kodak XAR X-ray film for 72 h at −70° C. using an intensifying screen.

About fifty positive hybridizing plaques, appearing in duplicate were found per plate. Twelve positive plaques were picked from the plate using a Pasteur pipette and the phages were eluted from the agar plug in 1 ml of SM buffer containing 20 µl chloroform, as described in Maniatis et al (1982, pp. 64). The phages obtained were purified by repeating the procedure described above using filter replicas from plates containing 50–100 plaques of the isolated phages.

After purification the phages were propagated by plating $5 \times 10^3$ phages on NZYCM medium. After overnight incubation at 37° C. confluent plates were obtained, from which the phages were eluted by adding 5 ml SM buffer and storing the plate for 2 hours at 4° C. with intermittent shaking. After collection of the supernatant using a pipette, the bacteria were removed from the solution by centrifugation at 4,000×g for 10 minutes at 4° C. To the supernatant 0.3% chloroform was added and the number of pfu was determined. These phage stocks contain approximately $10^7$ pfu/ml.

EXAMPLE 5.2.4

Restriction Analysis of cbh cDNA Clones

The recombinant Uni-ZAP XR clones containing cbh cDNA were converted to Bluescript phagemids by superinfection with the filamentous helper phage ExAssist™, which is included in the ZAP™-cDNA synthesis kit from Stratagene, according to the manufacturer's instructions.

The phagemid DNA was subsequently isolated as described in Sambrook et al. (1989, pp. 1.25–1.28).

The isolated DNA of eight cbh cDNA clones were subjected to restriction analysis using the following restriction enzymes: EcoRI and XhoI. The DNA was digested for 2 hours at 37° C. in a reaction mixture composed of the following solutions; 2 µl (>>1 µg) DNA solution; 2 µl of the appropriate 10*React buffer (Life Technologies); 10 U of each Restriction enzyme (Life Technologies) and sterile distilled water to give a final volume of 20 µl. After addition of 4 µl DNA loading buffer the samples were loaded on a 0.7% TAE-agarose gel. The DNA fragments were separated by electrophoresis at 80 V for 1.5 hours. The restriction analysis of the isolated cDNA clones revealed two types of plasmid; one containing inserts of 1.2 kb, the other inserts of 1.8 kb.

EXAMPLE 5.2.5

Sequence Analysis of *A. niger* cbh cDNA Clone CBHA-C9

Figure 2:
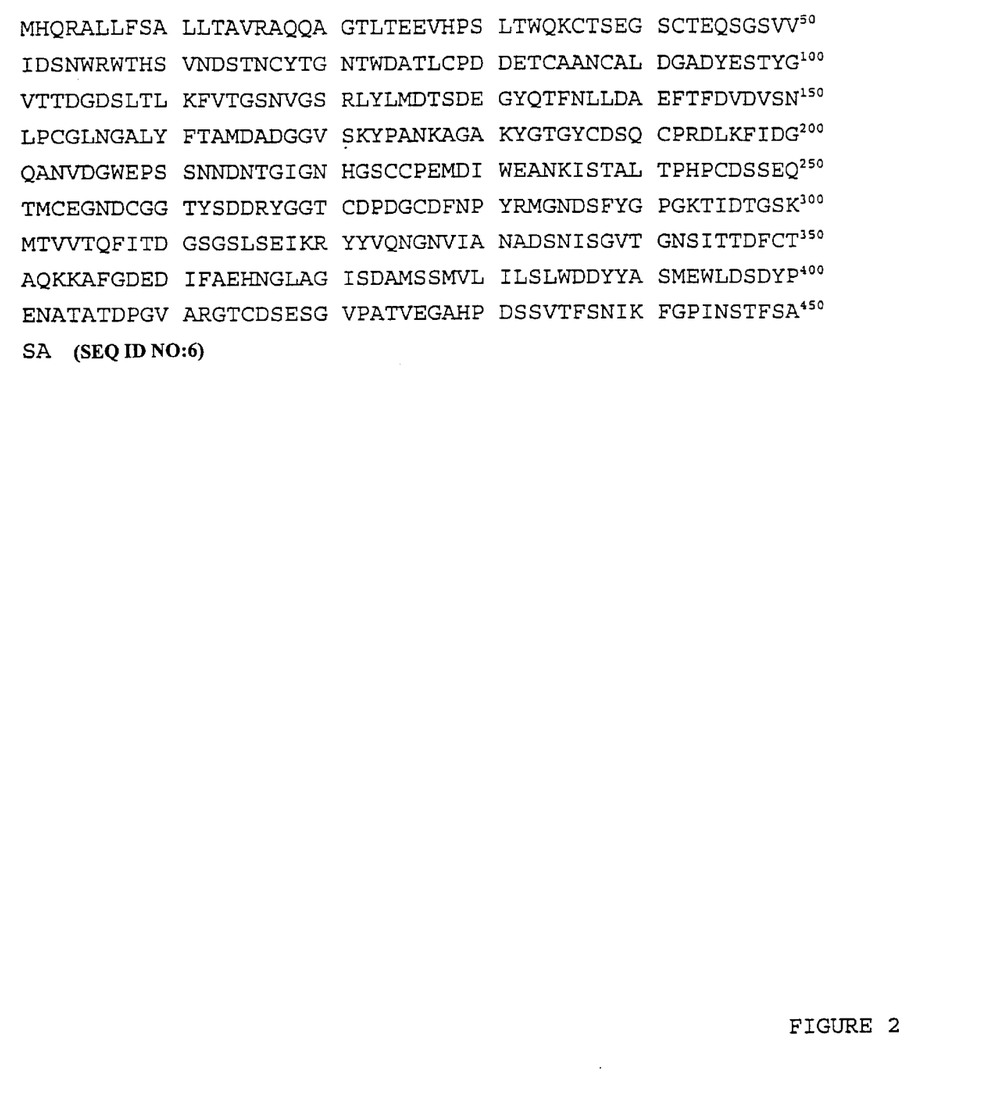
FIG. 2: SEQ. ID. NO: 6

The sequence of the *A. niger* cbh cDNA clones was determined by subcloning fragments from one of the positive clones of Example 5.2.4 with 1.8 kb insert, called CBHA-C9, in pBluescript SK⁻ (SEQ. ID. NO.5). Sequencing reactions were conducted using the ThermoSequenase fluorescent labelled primer cycle sequencing kit (Amersham) with universal sequencing primers. The sequencing reactions were analyzed on an ALFexpress sequencer (Pharmacia). Sequence analysis was performed using the Winstar programme (LaserGene) and yielded the sequence as shown in FIG. 1/SEQ.ID.NO. 5. The amino acid sequence of the coding region, corresponding to nucleotides 49 to 1404, is shown in FIG. 2/SEQ.ID.NO. 6. The coding region encodes the native enzyme (amino acid 18 to 452) plus its pre-sequence (amino acid 1 to 17). The protein does not contain a linker peptide, nor a cellulose binding domain.

EXAMPLE 5.2.6

Screening of the *A. niger* Genomic Library for the cbhA Gene

For the screening of the *A. niger* genomic library, constructed as described by Harmsen et al. (1990), for the cbhA gene $3 \times 10^3$ pfu per plate were plated in NZYCM top-agarose containing 0.7% agarose on five 85-mm-diameter NZYCM (1.5% agar) plates as described (Maniatis et al., 1982, pp. 64), using *E. coli* LE392 as plating bacteria.

After overnight incubation of the plates at 37° C. two replicas of each were made on HybondN filters (Amersham) as described in Maniatis et al (1982, pp. 320–321).

The filters were prehybridized at 68° C. for two hours in prehybridization buffer containing; 6×SSC, 0.5% SDS, 5×Denhardt's solution, 0.01 M EDTA and 100 µg/ml heat denatured herring sperm DNA (Boerhinger Mannheim). After two hours prehybridization, the prehybridization buffer was replaced by hybridization buffer which was identical to the prehybridization buffer, but contains the $^{32}$P labelled the 1.8 kb insert from cDNA clone CBHA-C9 and prepared as described in Example 5.2.2. The filters were hybridized for 18 hours at an temperature of 68° C.

After hybridization the filters were first washed at 68° C. for 30 minutes in 4*SSC/0.1% SDS followed by a second wash at 68° C. during 30 minutes in 2*SSC/0.1% SDS. The filters were then washed twice at 68° C. for 30 minutes with 0.1*SSC/0.1% SDS. The air dried filters were taped on a sheet of Whatman 3MM paper, keying marks were made with radioactive ink and the Whatman paper and filters were covered with Saran Wrap. Hybridizing plaques were identified by exposure of Kodak XAR X-ray film for 72 h at −70° C. using an intensifying screen.

Two to three positive hybridizing plaques, appearing in duplicate were found per plate. Five positive plaques were picked from the plate using a Pasteur pipette and the phages were eluted from the agar plug in 1 ml of SM buffer containing 20 µl chloroform, as described in Maniatis et al. (1982, pp. 64). The phages obtained were purified by repeating the procedure described above using filter replicas from plates containing 50–100 plaques of the isolated phages.

EXAMPLE 5.3

Expression of cbhA cDNA in *A. niger*

EXAMPLE 5.3.1

Construction of a cbhA Expression Cassette

The cDNA clone CBHA-C9 of Example 5.2.5 was used to construct an expression plasmid. All digestions were conducted using 1–3 µg DNA, 2 µl of the appropriate 10*React buffer (Life Technologies), 10 U Restriction enzyme (Life Technologies) and sterile distilled water to give a final volume of 20 µl. Digestions were incubated at 37° C. for 1–2 hours. The digested samples were loaded on a 0.7% agarose gel in TAE buffer and the DNA fragments were subsequently separated by electrophoresis at 80 V. After electrophoresis the appropriate band was sliced out and the DNA fragment was isolated using the GeneClean™ kit (Biogel 101 Inc.), according to the manufacturers instructions. Ligations were performed in 10*ligation buffer (Promega), 50–100 ng vector DNA, a 3-fold molar excess of insert DNA, 1 U T4-Ligase resulting in a final volume of 10 μl. After incubation overnight at 15° C., 4 μl of the mixture was used to transform E. coli DH5α competent cells prepared as follows: 200 μl of an E. coli DH5α overnight culture pregrown in LB medium (LB medium per 1000 ml: 10 g trypticase peptone (Life Technologies), 5 g yeast extract (Life Technologies), 10 g NaCl, 0.5 mM Tris-HCl pH 7.5). This culture was incubated in an orbital shaker at 37° C. until its density corresponds to an O.D.600 of 0.15–0.2. The bacteria were then collected by centrifugation at 3000 rpm at 4° C. After discarding the supernatant the cells were kept on ice constantly. The bacterial pellet was washed in 40 ml K-MES transfer buffer (per 100 ml: 6 ml 1 M $CaCl_2$, 0.5 ml 1 M $MgCl_2$, 4 ml 0.5 M K-MES pH 6.0, 0.5 ml 1 M $MnCl_2$) by resuspending these cells followed by centrifugation as described above. Finally the cells were resuspended in 10 ml K-MES/glycerol (=K-MES transfer buffer+15% glycerol). Aliquots (50 μl) were either used immediately for transformation or frozen at −70° C.

E. coli DH5α competent cells were used in transformation experiments by combining 50 μl of the cells suspension with 4.5 μl of the ligation mixture. After a 30 minute incubation period on ice, the cells were incubated for 2 minutes at 42° C. Then 1 ml LB medium was added and the cells were incubated at 37° C. for 1 hour. The bacteria were then collected by centrifugation at 14,000 g for 20 seconds after discarding the supernatant the cells were resuspended in 100 μl LB medium. The resulting bacterial suspension was plated on LB medium containing 100 μg/ml ampicillin and 50 μg/ml X-gal and 60 μg/ml IPTG in case of blue/white screening.

A selection of 2–12 of the resulting colonies were grown overnight in LB medium containing 100 μg/ml ampicillin. From the cultures plasmid DNA was isolated by the alkaline lysis method as described by Maniatis et al. (1982, pp. 368–369), which was used in restriction analysis as described in Example 5.2.4 to select a clone harboring the desired plasmid.

The above described methods were used to construct the cbhA expression plasmid designated as pIM3006. The plasmid promH, containing the A. niger pkiA promoter, was digested with SstI and NsiI and ligated into SstI-NsiI digested pCBHA-C9. After linearization of the resulting plasmid, which contains the pkiA-cbhA fusion, using SstI, this construct was partial digested using BglII. The 2.4 kb SstI-BglII fragment was ligated into a BamHI-SstI digested plasmid carrying a BamHI-HindIII fragment containing the terminator of the Aspergillus nidulans trpC gene. The BglII restriction site lies approximately 150 bp downstream the putative stop codon. The resulting construct is designated as pIM3006.

Plasmid DNA was isolated on a large scale from 100 ml cultures E. coli DH5α containing the final expression plasmid pIM3006 grown in LB medium containing 100 μg/ml ampicillin using the Nucleobond PC-100 kit (Nagel) according to the manufacturers instructions.

EXAMPLE 5.3.2

Introduction of the cbhA Expression Construct in A. niger 752.1 by Cotransformation and Screening of Transformants for the Expression of the A. niger cbhA Gene The plasmid pIM3006, obtained in Example 3.1 was introduced in A. niger by cotransformation of A. niger 752.1 using the A. niger pyrA as a selective marker on the plasmid pGW635 (Goosen et al., 1989) and the plasmid pIM3006 as the cotransforming plasmid.

Protoplasts were prepared from mycelium by growing A. niger 752.1 on minimal medium supplemented with 0.5% yeast extract, 0.2% casamino acids, 50 mM glucose, 1.5 mM leucine and 10 mM uridine for 18 hours at 30° C. The preparation of protoplasts of A. niger 752.1 and the transformation procedure was performed as described by Goosen et al., 1987. The resulting $PYR^+$ transformants were analyzed for the expression of the A. niger cbhA gene by SDS-PAGE.

The transformants were analyzed for the formation of the A. niger cbhA gene product, the CBHA protein. Twelve of these transformants were used in a growth experiment to analyze for CBHA expression. The transformants were grown in 50 ml minimal medium (per liter medium: 15 g $KH_2PO_4$, 0.5 g KCl, 0.5 g $MgSO_4.7H_2O$, 6 g $NaNO_3$, 1 ml Vishniac solution (Vishniac and Santer, 1957), pH 6.0) containing 4% D-fructose, 0.1% yeast extract and 1.5 mM leucine for 30 hours at 30° C. After growth, the mycelium was removed by filtration and the culture filtrate was analyzed by SDS-PAGE. Transformant 752.1::pIM3006-55 was the best CBHA producer (approx. 20 μg $ml^{-1}$).

EXAMPLE 5.3.3

Purification of the CBHA Enzyme

A 1 l Erlenmeyer flask containing 300 ml medium (per liter medium: 4 g $NH_4Cl$, 1.5 g $KH_2PO_4$, 0.5 g KCl, 0.5 g $MgSO_4.7H_2O$, 1 ml Vishniac salts solution (contains per liter 10 g EDTA, 4.4 g $ZnSO_4.7H_2O$, 1.0 g $MnCl_2.4H_2O$, 0.32 g $CoCl_2.6H_2O$, 0.32 g $CuSO_4.5H_2O$, 0.22 g $(NH_4)_6Mo_7O_{24}.4H_2O$, 1.47 g $CaCl_2.2H_2O$, 1.0 g $FeSO_4.7H_2O$, pH 4.0 (Vishniac and Santer, 1957)), pH 5.0 supplemented with 0.2% ultrafiltrated yeast extract (Life Technologies), 0.5% casamino acids (Life Technologies), 10 mM leucine and 5% sucrose as C-source) was inoculated with $2*10^9$ spores of strain 752.1::pIM3006-55 and grown for 6 hours at 30° C. This entire culture was then added to 1.7 liter medium in an Applikon 3 liter fermentor (BTS06) which was controlled by a Bioprocessor unit ADI 1020 (Applikon). The fermentation was temperature controlled at 30° C. and the pH was allowed to drop to pH 3.0 at which it was maintained by addition of 5N NaOH. 1.9 liter culture broth was drained from the fermentor 30 hours after inoculation. The mycelia was separated from the culture broth by filtration. The fermentor was filled again with 2 liter of fresh culture medium and cultured for another 30 hours as described above. After this second run the mycelia was separated from the culture broth by filtration. The culture filtrates from the both runs were combined and piperazine was added to a final concentration of 10 mM. The pH was adjusted to pH 5.5 with 10 N NaOH. The culture filtrate was then applied on a Streamline™ anion exchange column (Pharmacia). After loading, the column was washed with 10 mM piperazine-HCl (pip-HCl) pH 5.5. The enzyme was eluted from the column by applying a salt pulse using 10 mM pip-HCl pH 5.5/1 M NaCl. Fractions of 15 ml were collected and CBH activity was detected using the chromogenic substrate 4-methylumbelliferryl-β-D-cellobioside (detects cellobiohydrolases) (Sigma M-6018). The majority of the CBH activity was present in the fractions 2, 3 and 4. These fractions were pooled and dialyzed against 10 mM pip-HCl pH 5.5.

References

Goosen, T., Engelenburg, F. van, Debets, F., Swart, K., Bos, K., Briek, H. van den, (1989) Mol. Gen. Genet. 219: 282–288

Harmsen, J. A. M. et al., (1990) Curr. Genet. 18: 161–166

Maniatis T., E. F. Fritsch, J. Sambrook (1982): Molecular cloning, a laboratory manual; Cold Spring Harbor Laboratory, New York.

Murray, N. (1977) Mol. Gen. Genet. 150: 53–58

Saiki R. K. et al. (1988) Science, 239, 487–491

Sambrook, J., Fritsch, E. F., Maniatis, T. (1989) In: *Molecular Cloning: a Labatory Manual,* 2nd edn., Cold Spring Harbor Labatory Press, NY.

Visniac, W. and Santer, M. (1957), Bact. Rev. 21: 195–213

---

What is claimed is:

1. A bread dough comprising flour and at least 0.5 mg of cellobiohydrolase (CBH) per kg of flour and less than 100 mg of CBH per kg of flour.

2. The bread dough of claim 1 wherein the CBH is derived from Aspergillus or Trichoderma.

3. The bread dough of claim 1 wherein said CBH is recombinantly produced.

4. A method to produce a bread dough which comprises mixing flour, water and yeast, and adding at least 0.5 mg of cellobiohydrolase (CBH) per kg of flour and less than 100 mg of CBH per kg of flour.

5. The method of claim 4 wherein the CBH is derived from Aspergillus or Trichoderma.

6. The method of claim 4 wherein said CBH s recombinantly produced.

7. The method of claim 4 wherein said CBH is contained in a bread improving composition.

8. The method of claim 7 wherein the CBH is derived from Aspergillus or Trichoderma.

9. The method of claim 7 wherein said CBH is recombinantly produced.

10. An improved dry premix for bread dough, which premix comprises flour, wherein the improvement comprises the addition of at least 0.5 mg of cellobiohydrolase (CBH) per kg of flour and less than 100 mg of CBH per kg of flour.

11. The premix of claim 10 wherein the CBH is derived from Aspergillus or Trichoderma.

12. The premix of claim 10 wherein said CBH is recombinantly produced.

13. A method to prepare a dry premix for bread dough, which premix includes flour, which method comprises adding at least 0.5 mg of cellobiohydrolase (CBH) per kg of flour and less than 100 mg of CBH per kg of flour to said premix.

14. The method of claim 13 wherein the CBH is derived from Aspergillus or Trichoderma.

15. The method of claim 13 wherein said CBH is recombinantly produced.

16. A method to prepare a composition comprising bread improving components, which comprises adding at least 0.5 mg of cellobiohydrolase (CBH) per kg of flour and less than 100 mg of CBH per kg of flour to a composition containing bread improving components other than cellobiohydrolase (CBH).

17. The method of claim 16 wherein the CBH is derived from Aspergillus or Trichoderma.

18. The method of claim 16 wherein said CBH is recombinantly produced.

* * * * *

SEQUENCE LISTING

<160> NUMBER OF SEQ ID NOS: 6

<210> SEQ ID NO 1
<211> LENGTH: 14
<212> TYPE: PRT
<213> ORGANISM: Artificial Sequence
<220> FEATURE:
<223> OTHER INFORMATION: Internal sequence

<400> SEQUENCE: 1

```
Leu Tyr Leu Met Ser Asp Asp Ser Asn Tyr Glu Leu Phe Lys
 1               5                  10
```

<210> SEQ ID NO 2
<211> LENGTH: 24
<212> TYPE: PRT
<213> ORGANISM: Artificial Sequence
<220> FEATURE:
<223> OTHER INFORMATION: Internal sequence

<400> SEQUENCE: 2

```
Leu Gly Asn Thr Asp Phe Tyr Gly Pro Gly Leu Thr Val Asp Thr Asn
 1               5                  10                  15

Ser Pro Phe Thr Val Val Thr Gln
            20
```

<210> SEQ ID NO 3
<211> LENGTH: 18
<212> TYPE: DNA
<213> ORGANISM: Artificial Sequence
<220> FEATURE:
<223> OTHER INFORMATION: PCR oligonucleotide

<400> SEQUENCE: 3
gtccgtacca acatggcc                                                 18

<210> SEQ ID NO 4
<211> LENGTH: 21
<212> TYPE: DNA
<213> ORGANISM: Artificial Sequence
<220> FEATURE:
<223> OTHER INFORMATION: PCR oligonucleotide

<400> SEQUENCE: 4
actcagaaac attggctata g                                             21

<210> SEQ ID NO 5
<211> LENGTH: 1701
<212> TYPE: DNA
<213> ORGANISM: Aspergillus niger

<400> SEQUENCE: 5
cgaaatcact aaaaggagac gactagagtc ttatacaatc tcattacaat gcatcaacgt    60
gcccttctct tctcagccct gctgacggct gttcgcgccc agcaagccgg aacgctcacg   120
gaggaagtcc atccttcctt gacctggcag aaatgcactt ctgaaggcag ctgcactgaa   180
cagagtggct cagttgtcat tgactcgaac tggcgctgga cccattccgt caatgacagc   240

-continued

```
accaattgct acactggcaa cacctgggat gcaactctct gccctgatga tgagacctgt    300
gcggccaact gcgccctgga cggagcagac tacgagtcca cctacggtgt caccactgac    360
ggtgattcat tgacactgaa attcgtcact ggctccaatg ttggctcgcg gttgtatcta    420
atggacacga gcgacgaggg ataccagacg ttcaacttgc ttgacgcaga gttcactttc    480
gacgttgatg tgtctaacct cccatgtggg ctaaacggcg cgttgtactt cactgcaatg    540
gacgccgatg gtggagtctc aaaataccct gccaataagg ctggagccaa gtacggaaca    600
ggatactgtg actcccaatg cccccgggac ctgaaattca tcgacggaca agccaacgtc    660
gatggctggg aaccttctag caacaatgac aacacaggta tcggcaatca cggttcttgc    720
tgccctgaaa tggatatctg ggaggcaaac aagatctcga ccgcattgac accccatcct    780
tgtgacagca gcgaacagac catgtgtgag ggtaacgact gcggtggaac ctactcggat    840
gatcgctacg gaggaacctg cgaccctgac ggctgcgact caacccctta cgcatgggc     900 aacgactctt tctacggtcc tgcaagacc atcgacaccg atccaagat gacggttgtg      960 acccagttca tcactgatgg ctctggctcc ctcagcgaga tcaagcgtta ctacgtgcag   1020
aacggaaatg ttatagcgaa cgctgattcc aacatctctg gagtgactgg aaactcgatc   1080
acaacggact tctgcactgc gcagaagaag gcctttggcg acgaggatat attcgctgag   1140
cacaatggac ttgctggaat cagtgatgcc atgtcttcca tggttctcat cttgagcttg   1200
tgggatgatt actatgccag catggagtgg ctcgacagcg actatcccga gaacgctacc   1260
gctaccgacc caggtgttgc acgcggaaca tgcgactcgg aatcaggcgt ccctgcgaca   1320
gtcgaggggg cgcatcccga ttcttcggtg accttctcaa acatcaagtt cggtcccatc   1380
aactcgacct tcagcgcttc cgcataaggg gaagtgcagg gttcagagcc tcaattacat   1440
cccacaagcc gaacacaaca ggacaggttc ctggaacgga atatgggaga gttgcgggct   1500
tgtaaatagt ccgaaaagtg gtcactgctt ttgtgtatcg ggctgtcttc ccatttttatt   1560 ttcattcact ccagattgat tgatgcagat cttgtttgtt gattctttca cttcgtgctg   1620
tgactttttg tacctaactt cacattcgtt tcttttctgt ttttgagtcc actcaatcca   1680
agagacagtt gttcctttgc t                                             1701
```

<210> SEQ ID NO 6
<211> LENGTH: 452
<212> TYPE: PRT
<213> ORGANISM: Aspergillus niger

<400> SEQUENCE: 6

Met His Gln Arg Ala Leu Leu Phe Ser Ala Leu Leu Thr Ala Val Arg
1               5                   10                  15

Ala Gln Gln Ala Gly Thr Leu Thr Glu Glu Val His Pro Ser Leu Thr
            20                  25                  30

Trp Gln Lys Cys Thr Ser Glu Gly Ser Cys Thr Glu Gln Ser Gly Ser
        35                  40                  45

Val Val Ile Asp Ser Asn Trp Arg Trp Thr His Ser Val Asn Asp Ser
    50                  55                  60

Thr Asn Cys Tyr Thr Gly Asn Thr Trp Asp Ala Thr Leu Cys Pro Asp
65                  70                  75                  80

Asp Glu Thr Cys Ala Ala Asn Cys Ala Leu Asp Gly Ala Asp Tyr Glu
                85                  90                  95

Ser Thr Tyr Gly Val Thr Thr Asp Gly Asp Ser Leu Thr Leu Lys Phe
            100                 105                 110

```
Val Thr Gly Ser Asn Val Gly Ser Arg Leu Tyr Leu Met Asp Thr Ser
            115                 120                 125

Asp Glu Gly Tyr Gln Thr Phe Asn Leu Leu Asp Ala Glu Phe Thr Phe
        130                 135                 140

Asp Val Asp Val Ser Asn Leu Pro Cys Gly Leu Asn Gly Ala Leu Tyr
145                 150                 155                 160

Phe Thr Ala Met Asp Ala Asp Gly Gly Val Ser Lys Tyr Pro Ala Asn
            165                 170                 175

Lys Ala Gly Ala Lys Tyr Gly Thr Gly Tyr Cys Asp Ser Gln Cys Pro
            180                 185                 190

Arg Asp Leu Lys Phe Ile Asp Gly Gln Ala Asn Val Asp Gly Trp Glu
            195                 200                 205

Pro Ser Ser Asn Asn Asp Asn Thr Gly Ile Gly Asn His Gly Ser Cys
    210                 215                 220

Cys Pro Glu Met Asp Ile Trp Glu Ala Asn Lys Ile Ser Thr Ala Leu
225                 230                 235                 240

Thr Pro His Pro Cys Asp Ser Ser Glu Gln Thr Met Cys Glu Gly Asn
            245                 250                 255

Asp Cys Gly Gly Thr Tyr Ser Asp Asp Arg Tyr Gly Gly Thr Cys Asp
            260                 265                 270

Pro Asp Gly Cys Asp Phe Asn Pro Tyr Arg Met Gly Asn Asp Ser Phe
            275                 280                 285

Tyr Gly Pro Gly Lys Thr Ile Asp Thr Gly Ser Lys Met Thr Val Val
            290                 295                 300

Thr Gln Phe Ile Thr Asp Gly Ser Gly Ser Leu Ser Glu Ile Lys Arg
305                 310                 315                 320

Tyr Tyr Val Gln Asn Gly Asn Val Ile Ala Asn Ala Asp Ser Asn Ile
                325                 330                 335

Ser Gly Val Thr Gly Asn Ser Ile Thr Thr Asp Phe Cys Thr Ala Gln
            340                 345                 350

Lys Lys Ala Phe Gly Asp Glu Asp Ile Phe Ala Glu His Asn Gly Leu
            355                 360                 365

Ala Gly Ile Ser Asp Ala Met Ser Ser Met Val Leu Ile Leu Ser Leu
    370                 375                 380

Trp Asp Asp Tyr Tyr Ala Ser Met Glu Trp Leu Asp Ser Asp Tyr Pro
385                 390                 395                 400

Glu Asn Ala Thr Ala Thr Asp Pro Gly Val Ala Arg Gly Thr Cys Asp
            405                 410                 415

Ser Glu Ser Gly Val Pro Ala Thr Val Glu Gly Ala His Pro Asp Ser
            420                 425                 430

Ser Val Thr Phe Ser Asn Ile Lys Phe Gly Pro Ile Asn Ser Thr Phe
            435                 440                 445

Ser Ala Ser Ala
        450
```